J. W. GEORGE.
ROTARY ENGINE.
APPLICATION FILED MAY 31, 1917.
1,256,995.
Patented Feb. 19, 1918.
2 SHEETS—SHEET 1.
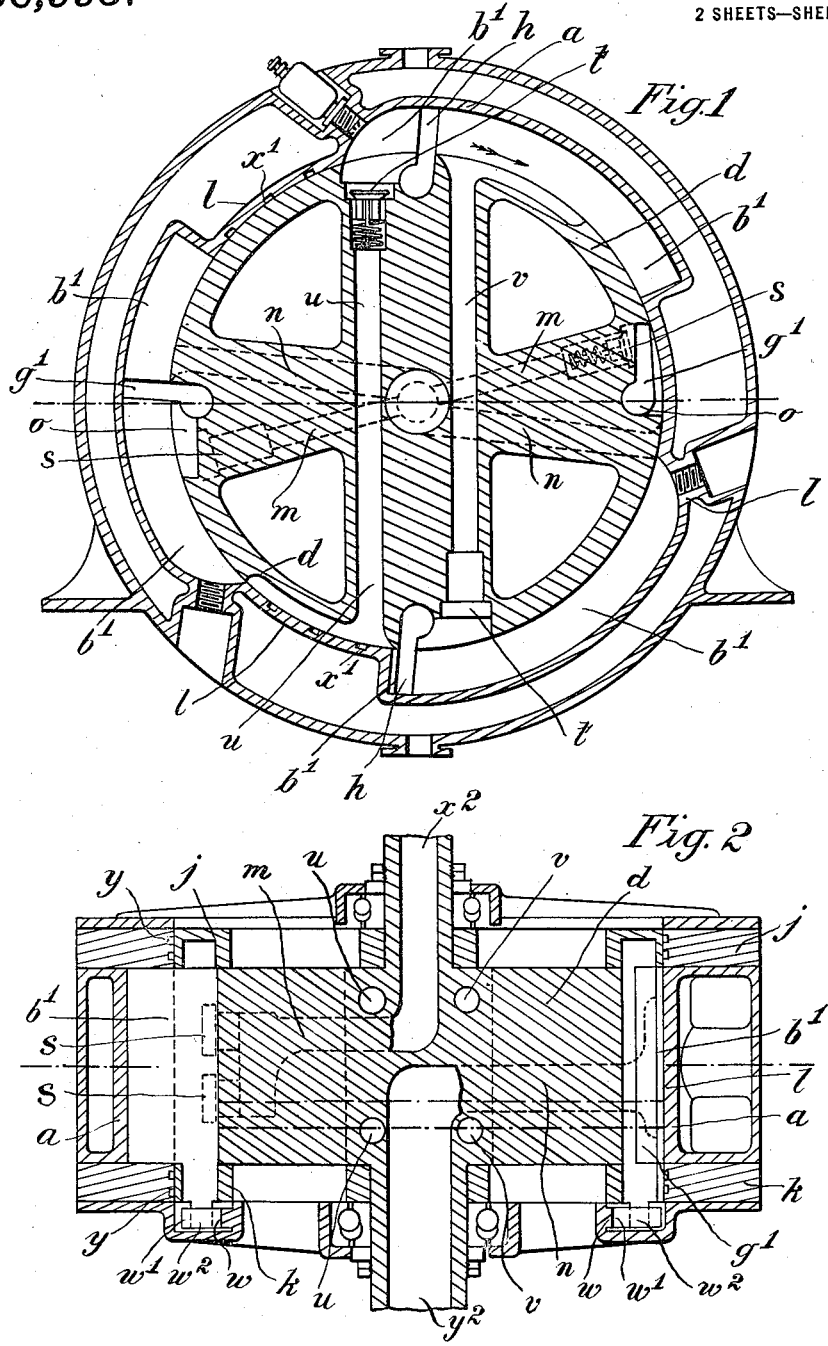
INVENTOR
JOHN WILLIAM GEORGE

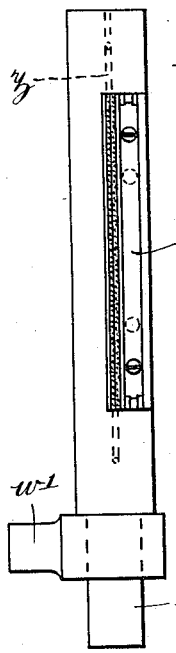
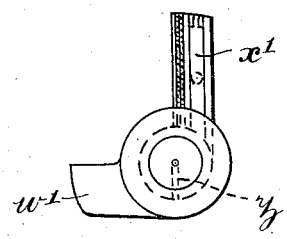
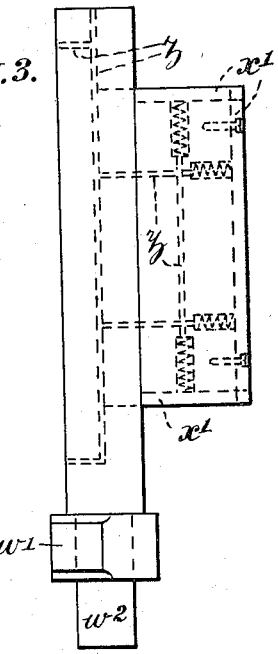
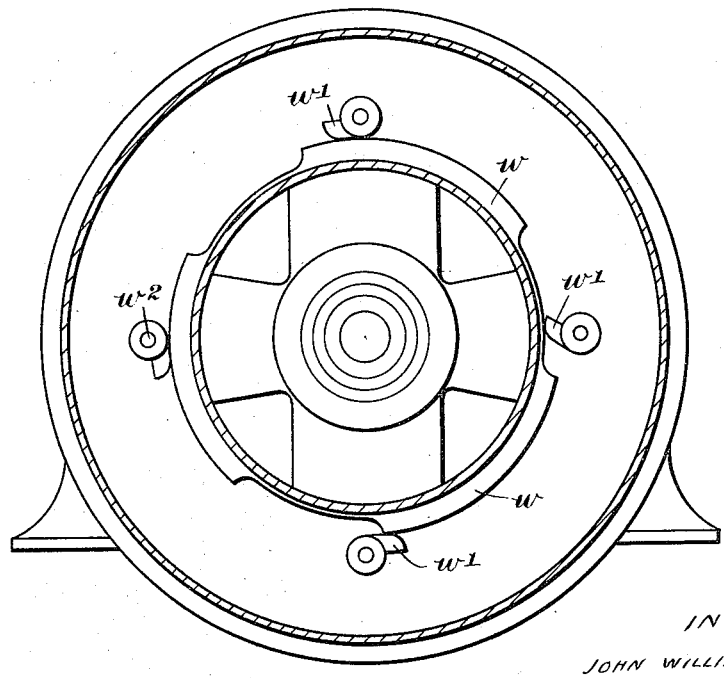

UNITED STATES PATENT OFFICE.

JOHN WILLIAM GEORGE, OF STROUD GREEN, ENGLAND.

ROTARY ENGINE.

1,256,995. Specification of Letters Patent. Patented Feb. 19, 1918.

Application filed May 31, 1917. Serial No. 171,996.

*To all whom it may concern:*

Be it known that I, JOHN WILLIAM GEORGE, a subject of His Majesty the King of England, and resident of Stroud Green, in the county of Middlesex, Kingdom of England, have invented certain new and useful Improvements in and Relating to Rotary Engines, of which the following is a specification.

This invention relates to rotary engines of the kind in which the compression chambers and the firing or power chambers are formed in the inner wall of an outer fixed cylindrical casing containing a rotating cylinder which carries the vanes operating in the said chambers.

Now the principal object of the present invention is to produce an improved engine having a fixed outer cylinder, an inner cylinder rotatable within said outer cylinder, compression and firing chambers formed in the inner wall of the outer cylinder, abutments dividing said chambers, inlet valves and fuel transfer valves and passages in the inner cylinder, hinged vanes arranged to operate within said chambers, and mechanism for operating the vanes.

A further object of the present invention is to produce an engine containing the above mentioned parts and constructed in such manner that a greater efficiency than at present is obtained and in which a continuous series of firing strokes are produced per revolution of the engine. The engine has less working parts than those of ordinary construction, and there is a very great saving of space and also of weight. The exhaust gases are swept out of the engine at the end of each explosion, and therefore no foul gas is left behind to be mixed with the incoming charge. The whole of the engine is water or air cooled inside and out. No retarding action is obtained as the force is continuously in one direction. Thorough lubrication is given to all the working parts of the apparatus which are also made gas tight with packing strips and rings which give the minimum of friction.

In the accompanying drawings:—

Figure 1 is a sectional elevation of a suitable construction of the engine.

Fig. 2 is a sectional plan thereof.

Figs. 3, 4 and 5 are detail views of one of the vanes and of a cam for operating the vane.

Fig. 6 is a view of the main cam surface.

According to the embodiment of the invention shown, an outer cylinder $a$ is provided with combined compression and firing or power chambers $b'$. These chambers $b'$ are arranged between the inner wall of the outer cylinder $a$ and the outer wall of an inner cylinder $d$. The inner cylinder $d$ is mounted axially in respect to the outer cylinder $a$ and serves as the rotating unit and is connected with suitable inlet and exhaust openings $x$ $y^2$ and carries suitable vanes $g'$ $h$, while the outer cylinder carries the compression and firing or power chambers $b'$.

The chambers $b'$ of the outer cylinder are arranged between the disk like ends or straight side walls $j$ $k$, and between the inside wall of the outer cylinder $a$ and the outside wall of the inner cylinder $d$. The lengths of these chambers $b'$ are determined by abutments $l$ projecting from the inner wall of the outer cylinder $a$ to the outer wall of the inner cylinder $d$. The abutments are carried by the outer cylinder $a$. The inside of the outer cylinder $a$ is therefore constructed with a set of chambers $b'$ which are so arranged that when the inner cylinder is placed into position all the chambers $b'$ are closed. The number and length of chambers $b'$ depend upon the size of the engine and the power it is desired to develop.

From the axially arranged inlet and exhaust openings $x^2$ $y^2$ of the inner cylinder $d$ extend radial passages $m$ $n$ so that the fuel or mixture can pass from the port $x^2$ through one set $m$ of said passages to the chambers $b'$ and from said chambers through another set of said passages $n$ to the exhaust port $y^2$. On the outer wall of the inner cylinder $d$ and disposed between said radial passages are suitably pivoted the vanes. These vanes are arranged to operate in said chambers $b'$, and are so constructed that when they pass the abutments $l$ contained on the inner wall of the outer cylinder $a$, they automatically fall into recesses $o$ disposed in the outer wall of the inner cylinder $d$. The vanes are continually pressed against the walls of the chambers $b'$ by any suitable means such as those hereinafter described. The number of vanes and the number of radial passages $m$ $n$ depend upon the number of chambers $b'$ employed in the construction of the engine and the relative numbers of vanes and chambers $b'$ will naturally vary with experience and practice, and in no way will interfere with the general construction of the engine.

In the construction shown I provide a main cam surface $w$ which can be mounted upon or carried by the outer cylinder $a$ and is disposed in the path of cams $w'$ attached to the spindles $w^2$ of the vanes $g'$ and $h$. It will thus be seen that as the inner cylinder revolves within the outer cylinder the cams $w'$ will ride over the main cam surface $w$ and transmit the necessary movements to the vanes. Any well known and suitable construction of firing mechanism can be used for causing the necessary explosions for the firing charges.

Valves $s$ $t$ and passages $u$ $v$ are provided to pass the compressed fuel or gas across the inner cylinder $d$ from the front of one vane $h$, which is momentarily serving as a compressing vane, to the back of another vane $h$ which is ready to receive a firing or power charge.

The operation of the engine is as follows:—

Packing strips and rings are represented at $x'$ and $y$ respectively, and oil passages whereby the vanes and their spindles are lubricated at $z$. The fuel or gas is sucked or drawn by one rotating vane $g'$ from an inlet valve in communication with the passage $x^2$ formed in the axis of the inner cylinder $d$. The fuel passes through a radial passage $m$ to the back of the vane $g'$; is retained in the particular chamber $b'$; compressed by the following vane $h$ and then passes directly across the inner cylinder to an approximately opposed chamber $b'$ through a suitable valve $t$ contained within the communicating passage $u$. The construction and disposition of the several parts of such apparatus are such that this compressed charge enters the second chamber immediately behind an operating vane $h$ and at the precise moment when the vane $h$ is ready to receive the firing or power charge. The fuel is exploded, giving energy to the vane $h$, and is then swept out in front and by the following vane $g'$ through suitably disposed radial passages $n$ connecting with an exhaust port in communication with the axial passage $y^2$ of the inner cylinder.

Although the invention has been described with reference to a particular construction of rotary engine I desire it to be understood that I in no way commit myself to the precise construction shown but reserve the right to construct any such engine whose design falls within the spirit and scope of the appended claims.

What I claim is:—

1. A rotary engine comprising an outer casing, a rotor mounted within said outer casing, compression and combustion chambers formed in the outer casing, vanes arranged to operate within said chambers, inlet passages carried by the rotor, and passages and valves in said rotor for the purpose of transferring a compressed charge from one chamber to another.

2. A rotary engine comprising an outer casing, a rotor mounted within said outer casing, compression and combustion chambers formed in the outer casing, vanes arranged to operate within said chambers, inlet and exhaust passages, and fuel transfer passages extending through the inner cylinder or rotor, and valves within said transfer passages.

3. A rotary engine comprising an outer casing, a rotor mounted within said outer casing, compression and combustion chambers formed in the outer casing, abutments separating said chambers, vanes arranged to operate within said chambers, means for operating said vanes, inlet passages carried by the rotor, fuel transfer passages extending through said rotor, and valves within said passages.

In testimony whereof I have hereunto signed my name.

JOHN WILLIAM GEORGE.